Figure 1:
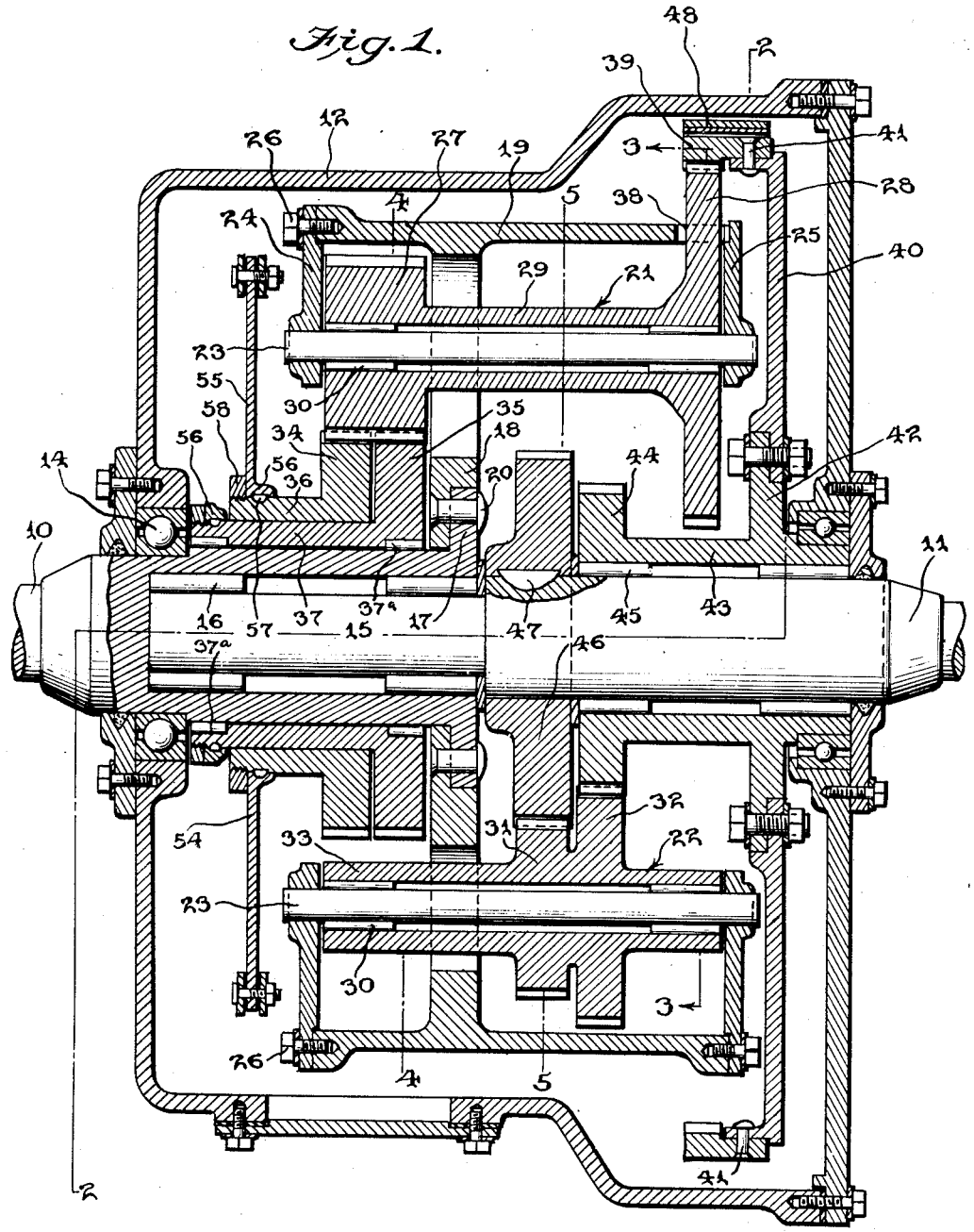

July 31, 1928.

Z. ALEXANDER

TRANSMISSION

Filed Dec. 20, 1927

1,679,287

2 Sheets-Sheet 1

INVENTOR.
Zeno Alexander

ATTORNEY.

July 31, 1928.  
Z. ALEXANDER  
1,679,287  
TRANSMISSION  
Filed Dec. 20, 1927   2 Sheets-Sheet 2
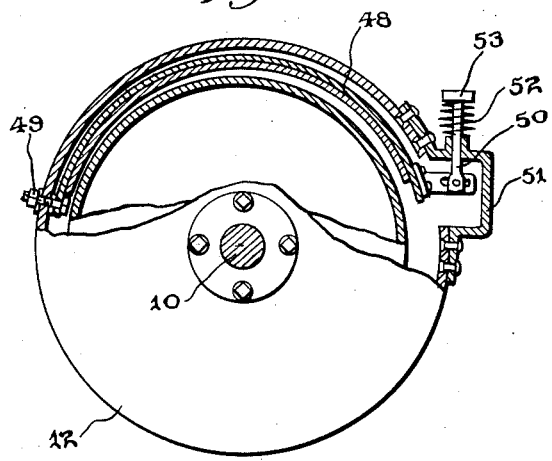
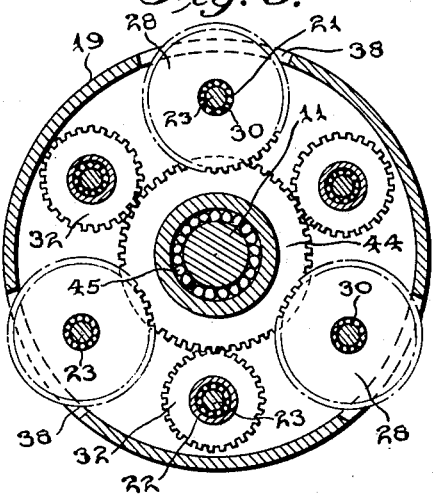
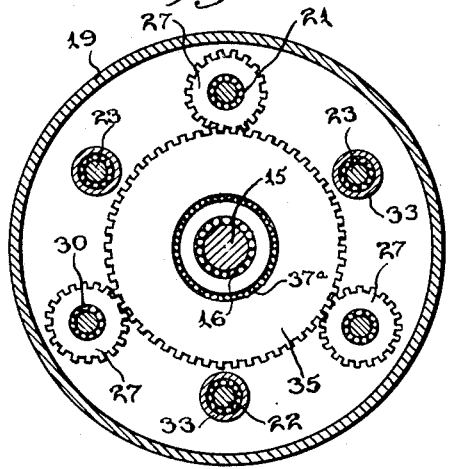
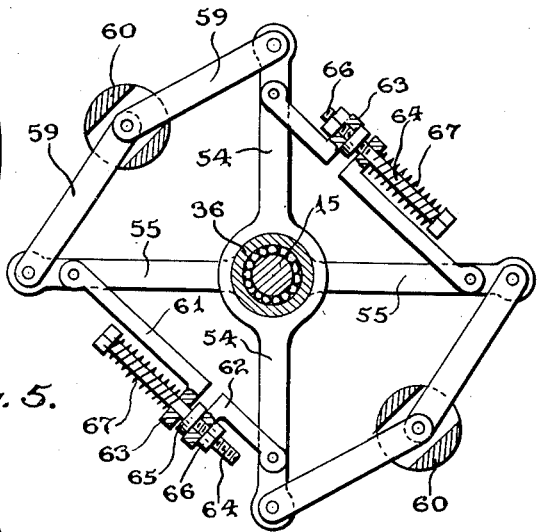
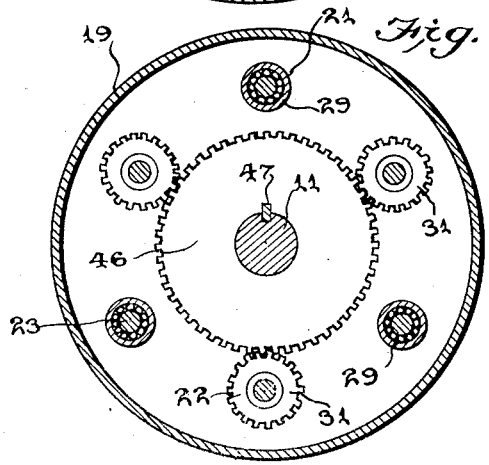
INVENTOR.  
Zeno Alexander  
BY  
ATTORNEY.

Patented July 31, 1928.

1,679,287

UNITED STATES PATENT OFFICE.

ZENO ALEXANDER, OF KANSAS CITY, MISSOURI.

TRANSMISSION.

Application filed December 20, 1927. Serial No. 241,357.

The object of the invention is to provide a transmission so constructed as to automatically provide for a change in the speed and torque factors of the driven member thereof, such as is necessary under varying load conditions, without any change in such factors on the part of the driving member; to provide a transmission in which these speed-torque changes are effected by the operation of governors, so arranged that the governors will be highly effective at the instant of starting the load from rest to provide for a maximum torque at this instant, the governor thereafter being ineffective to permit uniform acceleration of the load and finally effective to maintain synchronous movement of the load with the prime mover by which the driving element of the transmission is actuated; and to provide a transmission in which the construction is such that no condition may obtain where the driven element may overrun the driving element, thus making it possible, where the driving element is not being actuated by the prime mover, for the latter to exert a braking action on the load, as in the descent of an incline.

With this object in view, the invention consists in a construction and combination of parts of which a preferred embodiment is illustrated in the accompanying drawings, wherein:

Figure 1 is a central vertical sectional view through a transmission constructed in accordance with the invention.

Figures 2, 3, 4 and 5 are respectively transverse sectional views on the planes indicated by the lines 2—2, 3—3, 4—4 and 5—5 of Figure 1.

Figure 6 is a front elevational view of the governor detached.

The driving and driven members 10 and 11 are axially aligned and have an operative end to end connection within a housing 12 in the walls of which said members are journaled on appropriate ball bearings 14. The driven member 11 telescopes the driving member 10, having a reduced extension 15 entering the bore in the driving member, between the walls of which bore and said extension roller bearings 16 are interposed.

The rear end of the driving member is flanged as indicated at 17 and to this flange is connected the web 18 of a planet carrier 19 which is of drum form, fasteners 20 serving to connect the web to the flange 17.

The planet carrier 19 carries pluralities of sets of planet gears 21 and 22 uniformly spaced angularly around the driving and driven members, the sets 21 alternating with the sets 22. Each set is rotatably mounted on a shaft 23, the several shafts being supported in the planet carrier 19 through the medium of flanges 24 and 25, detachably secured to the planet carrier by cap screws 26. Each set of planetary gears 21 constitutes a pinion 27 and a gear 28 integral with a connecting hub portion 29, the gear and pinion being disposed at the extremities of the hub, and roller bearings 30 being interposed between the shaft 23 and the hub portion. The sets 22 consist each of a pinion 31 and a gear 32, the gear and pinion being disposed adjacent to each other but formed as an integral part of the hub 33, each of which is mounted upon its respective shaft 23 with an arrangement of roller bearings 30 identical with those used in connection with the sets 21.

Floatingly mounted upon the driver are the gears 34 and 35, these gears being of the same diameter but being formed respectively with sleeves 36 and 37, the latter surrounding the driver and being supported on roller bearings 37$^a$ and the former surrounding the latter. The two sleeves are designed for connection with the elements of a governor later described, and for this reason the sleeve 37 extends beyond the sleeve 36. The gears 34 and 35 mesh with the pinions 27, the latter having a face width equal to the combined widths of the gears 34 and 35.

The gears 28 which exceed the diameters of the pinions 27 by a material amount, extend through clearance slots 38 in the planet carrier 19, so that they may mesh with the annular or ring gear 39 which is secured to the disk 40, as indicated at 41, this disk being in turn secured to the flange 42 of the sleeve 43 which is an integral part of the gear 44, the sleeve 43 being disposed in surrounding relation to the driven member with respect to which it is rotatably mounted on roller bearings 45. The gear 44 meshes with the gears 32 of the planetary sets 22, the pinions 31 of which mesh with a gear 46 keyed, as indicated at 47, to the driven member.

The annular or ring gear 39 and the gear 44 are, it will be observed, relatively fixed and this double unit is floatingly mounted with respect to the driven member. Control of this double unit is essential, however, in the operation of the invention and to this end there is mounted within the housing 12 an arcuate brake member 48, one end of which is secured to the housing as indicated at 49 and the other end of which is operatively connected with a plunger 50 slidably mounted in an offset 51 in the housing, this plunger being normally elevated by a compression spring 52 bearing on the under face of the head 53 in which the plunger may be depressed by the hand or foot. Obviously the depression of the plunger will bring the brake member into contact with the periphery of the ring gear 39 which it partially surrounds and prevent any rotation of the ring gear and consequently of the gear 44. Except when the plunger 50 is depressed, the brake member will be disengaged from the ring gear through the action of the spring 52.

The governor employed in the invention consists of pairs of radial arms 54 and 55 with centrifugal means for effecting relative movement of the arms in one direction and resilient means for effecting relative movement in the opposite direction. Each pair of arms are made integral with a body ring 56 from which they extend radially in opposite directions, one pair of arms being carried by the sleeve 36 and the other pair by the sleeve 37, each body ring being keyed to its respective sleeve as indicated at 57 and secured in place by a nut 58 threadingly engaged with the sleeve and abutting the body ring. Pairs of links 59 carrying balls 60 at their pivotal connections have terminal pivotal connections with the terminals of the arms 54 and 55, as clearly shown in Figure 6. Thus the action of the governor balls under centrifugal force will tend to swing the arms 54 and 55 toward a position of parallelism. But means are provided for swinging the arms towards positions where they would be at right angles and such means comprise links 61 and 62 formed with right-angularly turned ears 63 through which screw studs 64 are passed with lock nuts 65 and 66 engaging the studs and abutting one of the ears on opposite sides. Springs 67 surround the screw studs and are compressed between the heads of the latter and the remaining ears 63. Thus the arms 54 and 55 under the influence of the weights 60 will be swung towards position of parallelism, the springs 67 being compressed in this operation; and under the influence of the springs shifted into positions at angles to each other. The lock nuts 65 and 66 provide for adjustment of the screw studs to regulate the pressure of the springs 67. The arms 54 and 55 being operatively connected with the gears 34 and 35 by reason of fixed connections with the sleeves thereof, relative movement of the pairs of arms effects a change in the line relation of the teeth of the gears 34 and 35. When the weights 60 are not subject to centrifugal force, the springs 67 position the arms so that the teeth of the gears 34 and 35 are in direct alignment, but when the weights function, the tendency is to disalign the teeth and thereby retard or prevent rotation of the pinions 27 on their own axes.

Assuming the driver 10 to be connected with a prime mover and the driven 11 connected with a load, such as would be the case with the driver connected to the engine of an auto vehicle and the driven connected with the propeller shaft of the same, if the prime mover be in motion and the driver rotating right-handedly with respect to a point of sight at the left of Figure 1, the planet carrier 19 will also be rotating right-handedly with the result that the pinions 31 will roll around the gear 46, their axial rotation being right-handedly. This will result in left-handed rotation of the gear 44 and the ring gear 39. But the carrier 19 is rotating right-handedly and the gear sets 21 are therefore carried bodily in a right-handed direction but by reason of the gears 28 meshing with the ring gear 39 and that moving in a left-handed direction, the gear sets 21 will be subjected to left-handed axial rotation, the pinions 27 rotating the gears 34 and 35 right-handedly. The rotation of the gears 34 and 35 will result in actuation of the governors with a tendency to disalign the teeth of the gears 34 and 35 and thus retard rotation of the pinions 27, thereby retarding axial rotation of the gear sets 21. This of course is attended with a reduction in the angular velocity of the ring gear 39 and the consequent starting of the load, since any force tending to oppose the rotation of the ring gear 39 will be reflected in a torque applied to the driven 11 through the gear train 44, 32, 31 and 46. As the load is put in motion, the angular speed left-handedly of the ring gear 39 drops off until finally the whole mechanism rotates in unison.

Take the condition where a turning movement is applied to the driven member extraneously, as by the propeller shaft in the descent of a hill by a vehicle equipped with the invention. Since right-handed rotation from the point of sight is assumed, the driven 11 and its gear 46 will then be rotating right-handedly, imparting left-handed axial rotation to the pinion 31 and gears 32 and thereby imparting right-handed rotation to the gear 44 and ring gear 39. This is assuming that the prime mover is at rest, as when deprived of fuel. The tendency then will be to rotate the carrier 19 left-handedly but of course such rotation will be opposed by the inertia of the prime mover but right-handed axial rotation will be imparted to the gear sets 21, with the result that the pinions 27 will rotate the gears 34 and 35, to actuate the governers to effect a disaligning action of the teeth of said gears 34 and 35, thus opposing or preventing axial rotation of the gear sets 21 with the result that the carrier 19 will then be moved right-handedly with the prime mover then driven by the load, the inertia of the prime mover effecting a braking action on the load.

The brake element 48 may be employed to effect the initial starting of a very heavy load by the application of a restraining force on the ring gear 39. The pressure of the plunger 50 will bring the brake element into engagement with the periphery of the ring gear so as to prevent rotation of that in either direction. By reason of the manner in which the brake element is mounted, the actuating means being to one side of the prime mover and the brake element being attached direct to the casing, restraining action to the left-handed rotation of the ring gear will be greater than restraining action to right-handed rotation, so that when the brake element is moved the ring gear will tend to partake of the same direction of motion as the prime mover. With the ring gear restrained, and the prime mover rotating right-handedly, the planet set 22 will roll around the gear 44 (that being also restrained by reason of its fixed connection with the ring gear) and the axial rotation of the planet set 22 will be right-handedly, which would impart reverse movement to the load, were it not for the fact that the carrier is moving right-handedly, and the gear 44 of smaller diameter than the gear 46, since it would be necessary that the carrier be stationary before any absolute reverse movement would be reflected in the gear 46. By this construction, a considerable reduction in gear ratio is provided initially and the load having been started, the release of the brake element leaves the parts under the control of the governor until the load is accelerated up to the speed of the driver.

The invention having been described, what is claimed as new and useful is:

1. A transmission comprising driving and driven members, a planet carrier operatively connected with the driving member, a rotary member, sets of planetary gears of which one set operatively connects the driven member and the rotary member and the other set is operatively connected with the rotary member, and a governor operatively connected with said other set to control the axial rotation of the same.

2. A transmission comprising driving and driven members, a planet carrier positively driven by the driving member, a rotary member concentric with the driven member and freely mounted with respect thereto, a rotary governor freely mounted with respect to the driving member and sets of planetary gears of which one set operatively connects the driven member and the rotary member and the other set operatively connects the rotary member and the governor.

3. A transmission comprising driving and driven members, a planet carrier positively driven by the driving member, a rotary member concentric with the driven member and freely mounted with respect thereto, a rotary governor freely mounted with respect to the driving member, and sets of planetary gears of which one set operatively connects the driven member and the rotary member and the other set operatively connects the rotary member and the governor, the governor comprising a pair of gears and centrifugal means for effecting relative angular movement between the two, and the governor-connected planet set having a pinion meshing with both of said gears.

4. A transmission comprising driving and driven members, a ring gear loosely mounted with respect to the driven member and having a spur gear fixedly mounted with respect to the ring gear, a planet carrier connected with and positively driven by the driving member, and sets of planetary gears of which one set operatively connects the driven member with said spur gear and the other set is axially rotated by said ring gear, the last said set being provided with means to oppose the axial rotation of the set.

5. A transmission comprising driving and driven members, a ring gear loosely mounted with respect to the driven member and having a spur gear fixedly mounted with respect to the ring gear, a planet carrier connected with and positively driven by the driving member, and sets of planetary gears of which one set operatively connects the driven member with said spur gear and the other set is axially rotated by said ring gear, the last said set being provided with means to oppose the axial rotation of the set, and said means comprising a pair of gears and a centrifugal governor for effecting relative angular or turning movement between the two, both of said gears being driven by a spur gear constituting an element of the last said planet set.

6. A transmission comprising driving and driven members, a planet carrier operatively connected with the driving member, a rotary member, sets of planetary gears of which one set operatively connects the driven member and the rotary member and the other set is operatively connected with the rotary member, a pair of gears loosely mounted with respect to the driving member and provided with fixed radial arms, and centrifugally actuated governors operatively connecting said arms, the last said planet set having a pinion meshing with both of said gears.

7. A transmission comprising driving and driven members, a planet carrier operatively connected with the driving member, a rotary member, sets of planetary gears of which one set operatively connects the driven member and the rotary member and the other set is operatively connected with the rotary member, a pair of gears loosely mounted with respect to the driving member, the last said planet set having a pinion meshing with said gears and the latter having arms and governors connecting the arms of the two in pairs, and resilient means operatively connecting the arms of the two gears in pairs, with the units of the second pair different from the units of the first pair.

8. A transmission comprising driving and driven members, a planet carrier operatively connected with the driving member, a rotary member, sets of planetary gears of which one set operatively connects the driven member and the rotary member and the other set is operatively connected with the rotary member, and a brake element engageable with the rotary member to preclude rotation of the same.

9. A transmission comprising driving and driven members, a planet carrier mounted upon and driven by the driving member, a ring gear having a spur gear fixedly connected therewith, said ring and spur gears being loosely mounted with respect to the driven member, a gear carried by the driven member, a governor loosely mounted with respect to the driving member and provided with a plurality of gears angularly movable relatively upon actuation of the governor, and sets of planetary gears of which the units of one set mesh respectively with said spur gear and the gear carried by the driven member and the units of the other mesh with the ring gear and the governor gears.

10. A transmission comprising driving and driven members, a planet carrier carried by and driven by the driving member, a ring gear having a spur gear fixedly connected therewith, the ring and spur gears being loosely mounted with respect to the driven member, a gear keyed to the driven member, a planetary gear set carried by the planet carrier and having its elements meshing respectively with said spur gear and the gear on the driven member, and means normally disengaged from the ring gear but engageable therewith to selectively permit or prevent rotation of the ring gear.

In testimony whereof he affixes his signature.

ZENO ALEXANDER.